United States Patent Office 2,818,407
Patented Dec. 31, 1957

2,818,407

OSMIUM TETROXIDE ACCELERATOR FOR THE PEROXIDE INITIATED POLYMERIZATION OF POLYMERIZABLE ORGANIC COMPOUNDS

Paul H. Aldrich, Wilmington, Del., assignor to Hercules Powder Company, Wilmington, Del., a corporation of Delaware No Drawing. Application December 30, 1954
Serial No. 478,895

12 Claims. (Cl. 260—94.3)

The present invention relates to a process for the addition polymerization of polymerizable organic compounds.

The polymerization of polymerizable ethylenically unsaturated compounds has achieved great importance in the art. Hitherto the polymerization of vinyl, vinylidene, acrylyl, alkacrylyl, and similar ethylenically unsaturated monomers has commonly been catalyzed or, more properly speaking, initiated, by peroxides such as benzoyl peroxide, tertiary butyl hydroperoxide, acetyl peroxide, cumene hydroperoxide, and the like. It is well known that these conventional polymerization systems usually require relatively high temperatures to initiate polymerization and to give high rates of conversion of monomer to polymer. The use of high temperatures is often inconvenient and undesirable both because inferior products often result and because special equipment is frequently required. In some instances, where appreciable rates of polymerization have been achieved at lower than usual temperatures, the products have possessed superior qualities and the polymerization process has been much simplified. Accordingly, new and improved processes which enable the art to utilize lower polymerization temperatures are of considerable interest.

This invention has as an object the provision of a new polymerization process by which the polymerization of polymerizable ethylenically unsaturated monomers is materially accelerated so that lower polymerization temperatures can be utilized.

In accordance with the invention, an ethylenically unsaturated monomer subject to addition polymerization is polymerized by bringing said monomer into contact with a peroxide and osmium tetroxide, the osmium tetroxide being present in an amount to provide more rapid polymerization than obtainable with the peroxide alone.

The following examples in which parts and percentages are by weight unless otherwise specified are illustrative of the invention. All polymerizations were carried out in an atmosphere of nitrogen.

EXAMPLE 1

A series of bulk polymerizations were carried out by the following procedure: To each of 15 part portions of methyl methacrylate there was added with stirring 1% of pinane hydroperoxide based on the methyl methacrylate and 0.9 part of a benzene solution of osmium tetroxide, the concentration of osmium tetroxide in the benzene being adjusted to provide varying amounts of osmium tetroxide on a monomer basis. The catalyzed portions of monomer, together with a control portion to which 1% of pinane hydroperoxide and 0.9 part of benzene containing no osmium tetroxide had been added, were allowed to stand at room temperature (approximately 24° C.) and observed over a period of hours during which the degree of polymerization of each portion was determined at intervals. The data are reproduced in the following table:

*Table I*

| OsO₄ | Percent Polymerized | | | | |
|---|---|---|---|---|---|
| | 5 hrs. | 6 hrs. | 7.25 hrs. | 23.5 hrs. | 5 days |
| 0.0 p. p. m | 0.03 | 0.06 | 0.09 | 0.59 | viscous liquid. |
| 2.6 p. p. m | 5.0 | 5.3 | 6.0 | too viscous to sample. | hard solid. |
| 5.2 p. p. m | 6.5 | 9.4 | 10.9 | gelled. | Do. |
| 10.5 p. p. m | 14.3 | 18.0 | 19.7 | ____do____ | Do. |
| 26.2 p. p. m | 20.4 | 26.4 | 31.2 | ____do____ | Do. |

From the table it is evident that those samples of monomer which contained osmium tetroxide polymerized much more rapidly than did the control sample.

EXAMPLE 2

The procedure of Example 1 was repeated using 1% of benzoyl peroxide in place of pinane hydroperoxide. As in the case of Example 1, the samples were allowed to stand at room temperature and observed for degree of polymerization. At the end of 26 hours, all samples were still liquid and were rated in order of decreasing viscosity as shown in the following table:

*Table II*

| OsO₄ | Percent Polymerized | | |
|---|---|---|---|
| | 2 hrs. | 5.7 hrs. | 26 hrs. [1] |
| 0.0 p. p. m | 1.56 | 2.57 | 3 |
| 2.6 p. p. m | 2.01 | 3.71 | 1 |
| 5.2 p. p. m | 1.99 | 4.16 | 1 |
| 12.9 p. p. m | 1.81 | 3.97 | 2 |

[1] Order of decreasing viscosity.

The data show that the samples of monomer containing osmium tetroxide polymerized more rapidly than the control sample. It is also apparent that there is an optimum amount of osmium tetroxide which provides the most rapid polymerization. The optimum in this specific instance is in the vicinity of 5.2 p. p. m. of osmium tetroxide.

EXAMPLE 3

The procedure of Example 1 was repeated using 1% of the acetate of pinane hydroperoxide in place of pinane hydroperoxide. The data obtained when the samples were allowed to stand at room temperature for 48 hours are shown in the following table:

*Table III*

| OsO₄ | Percent Polymerized | | | | |
|---|---|---|---|---|---|
| | 1.1 hrs. | 5.5 hrs. | 12.2 hrs | 25.8 hrs. | 48.0 hrs. |
| 0.0 p. p. m | 0.10 | 0.6 | 2.6 | 6.8 | 11.5 |
| 2.6 p. p. m | 3.0 | 5.8 | 9.6 | 19.2 | gelled. |
| 5.2 p. p. m | 4.2 | 7.4 | 9.6 | 24.2 | Do. |
| 12.9 p. p. m | 5.2 | 8.2 | 11.5 | 16.4 | Do. |
| 25.7 p. p. m | 4.8 | 7.2 | 7.9 | 14.0 | Do. |

EXAMPLE 4

Into a reaction vessel there was placed 200 parts of an aqueous 0.16% solution of polyvinyl alcohol. To this was added 125 parts of methyl methacrylate and 1% of pinane hydroperoxide on a monomer basis. There was next added 2.9 parts of a benzene solution of osmium tetroxide containing sufficient osmium tetroxide to give a concentration of 12.8 p. p. m. based on the methyl methacrylate. To a control sample there was added 1% of pinane hydroperoxide and 2.9 parts of benzene containing no osmium tetroxide.

The contents of the reaction vessel was agitated continuously for 7 hours at room temperature to polymerize the methyl methacrylate in aqueous suspension. At the end of 7 hours, hard beads of polymer were obtained. The control which had been treated identically showed no evidence of polymerization.

EXAMPLE 5

A series of bulk polymerizations with styrene as the monomer were carried out by adding to 15 parts of styrene 1% of cumene hydroperoxide based on the styrene and 0.9 part of a benzene solution of osmium tetroxide, the amount of osmium tetroxide being adjusted to provide varying concentrations based on the monomer. To a control sample 1% of cumene hydroperoxide and 0.9 part of pure benzene was added.

The catalyzed samples of monomer and the control sample were next allowed to stand at room temperature for 76.5 hours, during which time the degree of polymerization was determined at intervals. The data obtained are tabulated below:

Table IV

| $OsO_4$ | Percent Polymerized | | | | | |
|---|---|---|---|---|---|---|
| | 1.2 hrs. | 5.75 hrs. | 12 hrs. | 22 hrs. | 46 hrs. | 76.5 hrs. |
| 0.0 p. p. m | 1.5 | 2.2 | 4.0 | 6.74 | 13.2 | 21.8 |
| 2.6 p. p. m | 12.2 | 15.9 | 21.6 | 24.6 | 28.9 | 34.0 |
| 5.2 p. p. m | 12.2 | 14.8 | 16.7 | 18.3 | 21.7 | 26.4 |
| 12.9 p. p. m | 10.0 | 10.2 | 10.9 | 12.6 | 16.0 | 19.9 |
| 25.7 p. p. m | 7.2 | 7.58 | 9.0 | 10.1 | 13.3 | 17.3 |

As can be seen from the table, the samples containing osmium tetroxide polymerized more rapidly than the control sample, although the amount of osmium tetroxide appears to be optimum at about 2.6 p. p. m. It is noted further that the two samples containing the largest amounts of osmium tetroxide, while resulting in more rapid polymerization initially, showed a lower degree of polymerization at the end of the period of observation. This indicates that an inhibiting effect is obtained when the concentration of osmium tetroxide appreciably exceeds the optimum.

EXAMPLE 6

The procedure of Example 5 was repeated using 1% pinane hydroperoxide in place of cumene hydroperoxide. The data obtained are tabulated below:

Table V

| $OsO_4$ | Percent Polymerized | | | | | |
|---|---|---|---|---|---|---|
| | 1.4 hrs. | 5.8 hrs. | 12 hrs. | 22 hrs. | 46 hrs. | 76.5 hrs. |
| 0.0 p. p. m | 0.8 | 0.9 | 1.54 | 2.4 | 5.2 | 8.9 |
| 2.6 p. p. m | 7.2 | 9.9 | 16.7 | 23.1 | 29.3 | 37.5 |
| 5.2 p. p. m | 9.2 | 12.2 | 16.3 | 18.6 | 22.2 | 28.4 |
| 12.9 p. p. m | 8.7 | 9.3 | 10.6 | 12.1 | 15.5 | 19.6 |
| 28.7 p. p. m | 10.3 | 6.8 | 8.1 | 9.6 | 12.7 | 16.9 |

It is apparent again that the concentration of osmium tetroxide is optimum at about 2.6 p. p. m.

EXAMPLE 7

Into a reaction vessel there was placed 200 parts of an aqueous 1% solution of sodium lauryl sulfate. To this was added 50 parts of monomeric styrene and 1% of pinane hydroperoxide based on the styrene. There was then added 1 part of an aqueous solution of osmium tetroxide containing osmium tetroxide in an amount to provide a concentration of 8.15 p. p. m based on the styrene. To a control sample 1% of pinane hydroperoxide and no osmium tetroxide was added.

The contents of the reaction vessel was stirred to form an emulsion and stirring was continued for 71 hours at room temperature. At the end of 23 hours a conversion of 15.7% was obtained, at the end of 47 hours a conversion of 53.8% was obtained, and at the end of 71 hours a conversion of 64.4% was obtained. By contrast, the control sample showed a conversion of only 1.4% at the end of 41.7 hours.

EXAMPLE 8

The procedure of Example 1 was repeated using bis($\alpha,\alpha$-dimethylbenzyl) peroxide in place of pinane hydroperoxide and the data obtained are as follows:

Table VI

| $OsO_4$ | Percent Polymerized | |
|---|---|---|
| | 7.2 hrs. | 60 hrs.[1] |
| 0.0 p. p. m | 0.05 | 4 |
| 2.6 p. p. m | 0.13 | 1 |
| 5.2 p. p. m | 7.5 | 2 |
| 12.9 p. p. m | 0.07 | 3 |
| 25.7 p. p. m | 0.07 | 5 |

[1] Order of decreasing viscosity. Material rated #1 would not flow.

The data show that there is an optimum amount of osmium tetroxide, approximately 2.6 p. p. m., and that at some concentration above about 12.9 p. p. m. an inhibiting effect was realized.

EXAMPLE 9

The procedure of Example 1 was repeated using 15 parts of vinyl acetate in place of methyl methacrylate. The data obtained are as follows:

Table VII

| $OsO_4$ | Percent Polymerized | | | | | |
|---|---|---|---|---|---|---|
| | 2.2 hrs. | 3.3 hrs. | 6.8 hrs. | 12.2 hrs. | 26.0 hrs. | 48 hrs. |
| 0.0 p. p. m | 0.06 | 0.12 | 0.03 | 0.0 | 0.03 | 0.06 |
| 2.6 p. p. m | 8.6 | 12.3 | 27.3 | 35.4 | 54.7 | 60.9 |
| 5.2 p. p. m | 19.9 | 28.7 | 35.9 | 45.6 | 61.0 | 62.2 |
| 12.9 p. p. m | 36.9 | 38.2 | 42.6 | 45.7 | 51.7 | 52.6 |
| 25.7 p. p. m | 35.6 | 37.2 | 39.1 | 41.0 | 42.1 | 43.5 |

It is apparent that inclusion of osmium tetroxide in the polymerization results in a much faster degree of polymerization. Again, an optimum concentration of osmium tetroxide is observed, this time the optimum being approximately 5 p. p. m.

EXAMPLE 10

Into a reaction vessel there was placed 200 parts of a 1% aqueous solution of polyvinyl alcohol. There was added 125 parts of vinyl acetate and 1% by weight of pinane hydroperoxide based on the vinyl acetate. Next, one part of an aqueous solution containing osmium tetroxide in an amount to provide a concentration of 2.04 p. p. m. based on the vinyl acetate was added. The mixture was stirred at room temperature for 24 hours, at the end of which time the degree of polymerization was 7.87%. A control sample to which the hydroperoxide but no osmium tetroxide was added polymerized to the extent of only 0.1% at the end of 24 hours.

EXAMPLE 11

The procedure of Example 7 was repeated using 50 parts of vinyl acetate in place of styrene. At the end of 24 hours, polymerization had proceeded to the extent of 5.97%. A control sample to which no osmium tetroxide was added gave no evidence of polymerization.

EXAMPLE 12

To 50 parts of acrylonitrile there was added 1% by weight of pinane hydroperoxide and 0.9 part of a benzene solution of osmium tetroxide containing osmium tetroxide in the amount of 9.7 p. p. m. based on the monomer. To an identical control sample there was added the hydroperoxide and 0.9 part of pure benzene.

The sample was allowed to stand at room temperature. It became fairly cloudy in 20 minutes, opaque in 30 minutes, and at the end of an hour a heavy slurry had formed. The control sample showed no evidence of polymerization in 18 hours.

EXAMPLE 13

To 25 parts of a commercial laminating resin composed of 66% propylene glycol-phthalate-fumarate polyester and 34% styrene there was added 0.75% cumene hydroperoxide which was dissolved in the resin with stirring. There was next added 1 part of a benzene solution of osmium tetroxide, the concentration of osmium tetroxide in the benzene being sufficient to provide 1 p. p. m. of osmium based on the resin. The resin gelled in about 30 seconds and was then heated immediately to 35° C. and held at this temperature for one day. At the end of this time, the resin had cured substantially completely and had a Barcol hardness of 40.

An identical experiment in which the amount of osmium was lowered to 0.3 p. p. m. resulted in the resin gelling in 7 minutes.

EXAMPLE 14

The procedure of Example 1 was followed using 1% of p-menthane hydroperoxide in place of pinane hydroperoxide. The concentration of osmium tetroxide was 12.9 p. p. m. The methyl methacrylate polymerized to a hard solid in 48 hours. A sample containing no osmium tetroxide was still liquid after 48 hours.

EXAMPLE 15

The procedure of Example 1 was repeated using 1% of diisopropylbenzene hydroperoxide in place of pinane hydroperoxide at an osmium tetroxide concentration of 12.9 p. p. m. The methyl methacrylate polymerized to a hard mass in 48 hours. A sample containing no osmium tetroxide was still liquid after 48 hours.

As can be seen from the examples, this invention is of generic applicability to the addition polymerization, including copolymerization, of polymerizable ethenoid monomers, i. e., polymerizable compounds having the nonaromatic ethylenic >C=C< group.

In general, the invention is applicable to the polymerization of any ethylenically unsaturated compounds subject to addition polymerization by prior techniques. Optimum conditions may vary from monomer to monomer and, in general, liquid phase polymerization, as contrasted to gaseous phase polymerization, is desirable. It is particularly applicable to monomeric compounds having a terminal ethylenic group which is attached to a negative radical and particularly to vinylidene compounds, including vinyl compounds, which contain the $CH_2=C<$ group. These constitute a preferred class of monomers.

As exemplary of compounds having a terminal ethylenic group which are subject to polymerization by the process of the invention are olefins, e. g., ethylene and isobutylene; acrylyl and alkacrylyl compounds, e. g., acrylonitrile, methyl methacrylate, ethyl acrylate, methacrylic acid, methacrylamide; vinyl and vinylidene halides, e. g., vinyl chloride and vinylidene chloride; vinyl carboxylates, e. g., vinyl acetate and vinyl dimethyl acetate; vinylimides, e. g., N-vinylphthalimide; N-vinyl lactams, e. g., N-vinyl caprolactam; vinyl benzenes, e. g., styrene; heterocyclic vinyl compounds, e. g., vinyl pyridine; vinyl ketones, e. g., methyl vinyl ketone; and vinyl ethers, e. g., vinyl ethyl ether.

In addition, compounds having a plurality, i. e., more than one, ethylenic double bonds can be polymerized or copolymerized by the process of this invention. Exemplary of such compounds are ethylene glycol dimethacrylate, methacrylic anhydride, diallyl maleate and divinyl benzene.

The process is applicable also to the copolymerization of a polymerizable monomer with one or more compounds which are not per se readily polymerizable. An outstanding example of this type of polymerization is the copolymerization of an unsaturated alkyd resin with a reactive monomer such as styrene. The type of unsaturated alkyd resin most commonly employed are those prepared by the esterification of a polyhydric alcohol and an $\alpha,\beta$-unsaturated dicarboxylic acid, such as maleic and fumaric acids. These unsaturated alkyd resins may also be modified by including in the esterification reaction various saturated monohydric alcohols or polycarboxylic acids. Exemplary of such modifying alcohols and acids are hydroabietyl alcohol, benzyl alcohol, phthalic acid, adipic acid, etc.

The polymerizations are usually carried out at a temperature of from $-20°$ C. to $100°$ C. depending on the nature of the monomer and other variables. The process is of particular advantage at a relatively moderate temperature in the order of $-10$ to $50°$ C. The temperature may be lower although the rate of polymerization may be correspondingly lower. Higher temperatures can be used in instances where the time of polymerization must be kept at a minimum, for example, in a continuous polymerization process. In general, the time required for substantial polymerization depends on such variables as the specific temperature, the concentration of peroxide and of osmium tetroxide and the reactivity of the monomer or monomers to be polymerized. In some cases, the polymerization can be taken to substantial completion in a matter of a few minutes, and in other cases up to 24 hours or even longer may be required.

Conventional manipulative procedures can be employed in the polymerization. The process is applicable to any type of polymerization, such as bulk, emulsion, solution or suspension polymerization, in which the monomer or monomers are uniformly distributed with the agents initiating polymerization.

The p-menthane hydroperoxide utilized in the examples is a commercially available material well known to the art and is prepared by the air oxidation of p-menthane. Chemically, it consists essentially of a mixture of isomeric hydroperoxides as represented by the structural formula

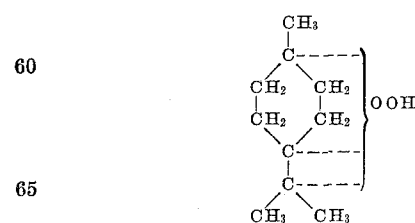

As it comes into commerce, p-menthane hydroperoxide is a crude material containing the above hydroperoxides with the balance being predominantly other oxidation products. Further information concerning the physical and chemical properties of p-menthane hydroperoxide can be found in Technical Service Bulletin No. 205, Hercules Powder Company, October 25, 1954.

The diisopropylbenzene hydroperoxide utilized in the examples is represented by the formula

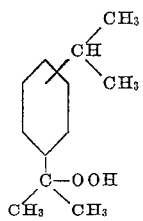

It, too, is a commercially available hydroperoxide and is also described in the aforesaid Technical Service Bulletin. It is ordinarily sold as a technical grade material containing about 53.8% active hydroperoxide.

The peroxides are generally employed in amounts of from about 0.1 to about 5% of the weight of the monomers to be polymerized. In addition to the peroxides illustrated in the examples, any other peroxide that is effective in initiating polymerizations of the type herein disclosed can be employed. As examples of such peroxides there is mentioned di(tertiary butyl) peroxide, acetyl peroxide, lauroyl peroxide, tertiary butyl hydroperoxide, tertiary butyl perbenzoate, stearoyl peroxide, phenylcyclohexane hydroperoxide, methyl ethyl ketone peroxide, etc.

The concentration of osmium tetroxide is fairly widely variable but is usually small in comparison to the amount of peroxide employed. It may be said generally that the amount of osmium tetroxide required to accelerate the polymerization is within the range of 0.1 to 200 p. p. m. based on the weight of monomer but that the optimum amounts within this range may vary considerably according to the specific peroxide and specific monomer, or monomers, involved. As can be seen from the examples there is very often an optimum concentration of osmium tetroxide above or below which the acceleration or polymerization is substantially less or even retarded. In most cases, an accelerating effect is realized when the osmium tetroxide is present in the amount of 0.5–20 p. p. m. based on the weight of monomer.

There may be present any other substance or compound which does not materially alter the basic and novel characteristics of the invention. Thus, for example, materials in common use such as emulsifying agents, inhibitors, plasticizers, dyes, pigments, and the like, can be present without detracting from the merits of the process.

What I claim and desire to protect by Letters Patent is:

1. In the polymerization of a polymerizable ethylenically unsaturated monomer, the improvement which comprises bringing said monomer into contact with a peroxide and osmium tetroxide, the osmium tetroxide being present in an amount within the range of 0.1 to 200 p. p. m. based on the weight of monomer to provide more rapid polymerization than obtainable with the peroxide alone.

2. The process of claim 1 in which the monomer comprises methyl methacrylate.

3. The process of claim 1 in which the monomer comprises styrene.

4. The process of claim 1 in which the monomer comprises vinyl acetate.

5. The process of claim 1 in which the monomer comprises acrylonitrile.

6. The process of claim 1 in which the styrene is copolymerized with an ethylenically unsaturated alkyd resin.

7. The process of claim 1 in which the peroxide is a hydroperoxide.

8. The process of claim 1 in which the peroxide is cumene hydroperoxide.

9. The process of claim 1 in which the peroxide is benzoyl peroxide.

10. The process of claim 1 in which the peroxide is diisopropylbenzene hydroperoxide.

11. The process of claim 1 in which the peroxide is bis($\alpha,\alpha$-dimethylbenzyl) peroxide.

12. The process of claim 1 in which the peroxide is p-menthane hydroperoxide.

References Cited in the file of this patent

UNITED STATES PATENTS 2,451,180     Stewart _____ Oct. 12, 1948

OTHER REFERENCES

Chugaev and Borodulin: Z. Anorg. Chem. 172, 227, abst. in Chem. Abstracts 22, 3363 (1928).